United States Patent [19]

Crook, Jr.

[11] 4,411,132

[45] Oct. 25, 1983

[54] WIRE ROPE TO CHAIN CONNECTOR FOR ANCHORING SYSTEMS

[75] Inventor: Edward J. Crook, Jr., Tulsa, Okla.

[73] Assignee: The Crosby Group, Tulsa, Okla.

[21] Appl. No.: 297,837

[22] Filed: Aug. 31, 1981

[51] Int. Cl.³ .............................................. F16G 15/04
[52] U.S. Cl. .......................................... 59/85; 59/93
[58] Field of Search ............... 59/85, 86, 93; 114/200, 114/230, 294; 403/157

[56] References Cited

U.S. PATENT DOCUMENTS

| | | | |
|---|---|---|---|
| 3,453,822 | 7/1969 | Crook | 59/85 |
| 3,828,550 | 8/1974 | Fink | 59/85 |
| 3,842,776 | 10/1974 | Wudtke | 114/230 |
| 3,912,228 | 10/1975 | Petty | 114/230 |
| 3,967,572 | 7/1976 | Lea | 114/230 |
| 3,977,181 | 8/1976 | Odegard | 59/93 |
| 3,985,093 | 10/1976 | Eidem | 114/230 |
| 4,034,556 | 7/1977 | Riber | 114/294 |
| 4,106,284 | 8/1978 | Crook | 59/85 |
| 4,107,917 | 8/1978 | Fink | 59/85 |
| 4,179,878 | 12/1979 | Albertini | 59/85 |

Primary Examiner—Gene Crosby
Attorney, Agent, or Firm—Head, Johnson & Stevenson

[57] ABSTRACT

An improved connector for coupling a chain to a wire rope or cable such that the resulting connection can be passed over a sheave, pulley, wheel or windlass without excessive stress applied to the wire rope. A housing is provided having an axially symmetric opening through the housing with an exterior surface adapted to rest upon the outer peripherial portion of the windlass (or the like) as the connection traverses the windlass and wherein a retaining pin perpendicular to the axis of the opening at essentially the center of the housing holds a pair of rotatable U-shaped members within the housing for connecting the chain to the wire rope. Such a connection is particularly useful in coupling an anchor chain to a wire rope in anchoring systems.

5 Claims, 9 Drawing Figures

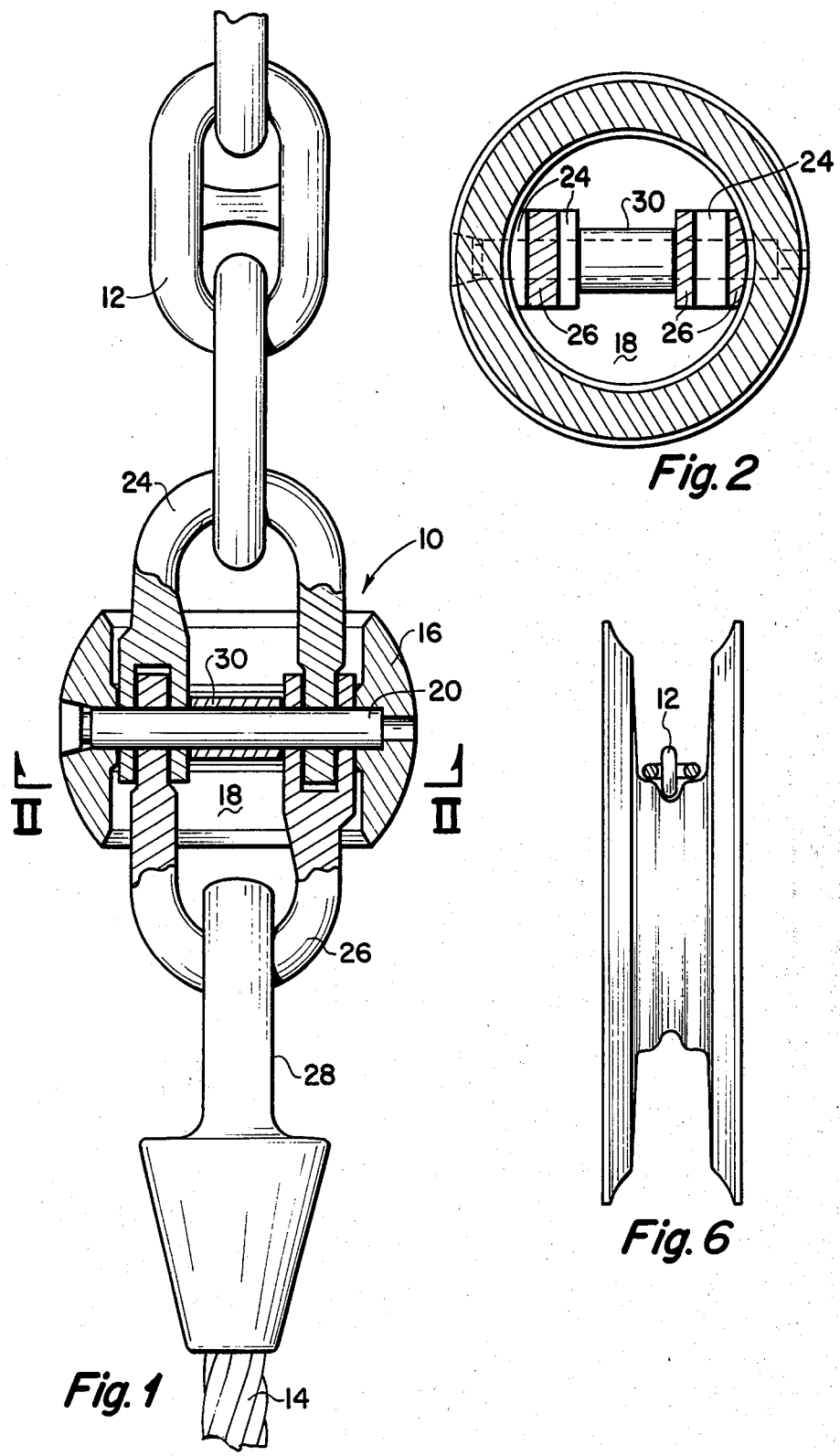

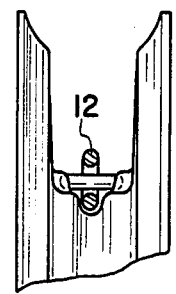
Fig. 7
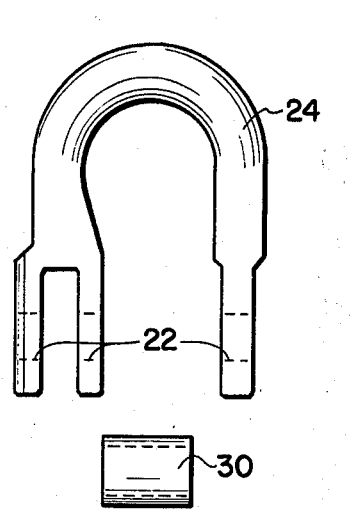
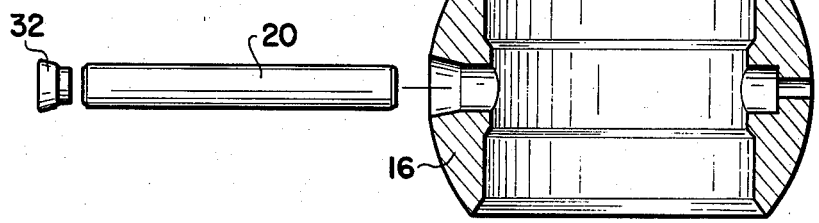
Fig. 3
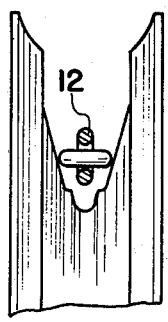
Fig. 8
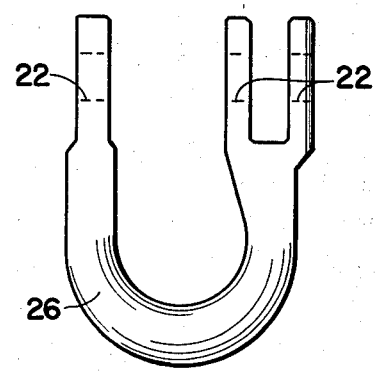

WIRE ROPE TO CHAIN CONNECTOR FOR ANCHORING SYSTEMS

BACKGROUND OF THE INVENTION

1. Field of the Invention

This invention relates to a connector for coupling a chain to a wire rope. More specifically, this invention relates to an improved connector that allows an anchor chain to wire rope connection to pass over a wheel or windlass without excessive stress being applied to the wire rope.

2. Description of the Prior Art

With the advent of heavy special purpose vessels, particularly offshore drilling vessels or other floating structures it has become common practice to use anchoring systems comprising a plurality of relatively long anchor lines each including a heavy anchor chain connected to a wire rope. Typically, systems employ from one to several thousand feet of anchor chain connected to the anchor and a length of wire rope connected to the end of the chain opposite the anchor. In order to handle such anchor lines various methods and apparatus have been suggested and employed with varying degrees of success. Thus, it is generally known to use combination wheels or sheaves having an inner groove dimensioned to accomodate the wire rope, and an outer groove, which may be pocketed, dimensioned to accomodate the chain. In some cases it has been proposed to employ simple link connectors between the anchor chain and the wire rope, but the bending forces in the wire rope at the connection have proved too great for such an arrangement to be completely satisfactory. Accordingly, many special connectors have been proposed but many of these have limitations, such as a limit of about 90° change in direction while traversing a wheel or sheave, or a requirement that the connection be oriented in a particular manner before it passes over the wheel or sheave. Other proposed special connectors can not be easily and totally disassembled thus, representing a problem when it is necessary to replace the wire rope, chain or connector. For example, U.S. Pat. Nos. 3,842,776; 3,912,228; 3,967,572; 3,977,181 and 3,985,093 generally disclose the anchoring systems known in the art and such connectors that are not amenable to quick assembly and disassembly.

SUMMARY OF THE INVENTION

In view of the disadvantages associated with the previously available wire rope to chain connectors, I have discovered an improved connector comprising:

a housing having an axially symmetric opening through the housing and an exterior surface circularly concentric to the opening;

a retaining pin adapted to mount within the housing such that the pin perpendicularly intersects the longitudinal axis of the opening at essentially the center of the housing;

a pair of substantially U-shaped members capable of being assembled within the opening of the housing and the U-shaped members having openings at the ends of each arm of the U-shaped members such as to interact, when assembled, with each other so that the openings will be coaxial and will accept the retaining pin; and a means to maintain U-shaped members, pin and housing in an assembled state.

The improved connector of the present invention provides for an essentially spherical exterior surface of the housing which is adapted to rest on the outer peripheral portion of a wheel, pulley, sheave, windlass or the like employed to guide the attached anchor chain and wire rope, such that the wire rope does not experience excessive strain as the connector passes over the wheel. It is further provided that the axial symmetric opening in the housing be adapted to allow significant angular deviation from and about the axis for both the anchor chain and wire rope.

A primary object of the present invention is to provide a connector for coupling a chain to a wire rope such that the resulting connection can be passed over a sheave, pulley, wheel or windlass through an arbitrarily large angle without excessive stress being applied to the wire rope. It is further object of this connector to be highly flexible, readily assembled and disassembled and not require any angular alignment or orientation as it approaches and passes over the sheave. Fulfillment of these objects and the presence and fulfillment of other objects will be apparent upon reading the complete specification and claims taken in conjunction with the attached drawing.

BRIEF DESCRIPTION OF THE DRAWINGS

FIG. 1 is a partial cross-sectional view of a preferred embodiment of the wire rope to chain connector according to the present invention.

FIG. 2 is a cross-sectional view of a connector as seen through line II—II of FIG. 1.

FIG. 3 is a cross-sectional view of the connector in FIG. 1 in a disassembled state.

FIGS. 6, 7 and 8 illustrate alternate internal structures of a sheave compatible with a connector of the present invention.

DETAILED DESCRIPTION OF THE PREFERRED EMBODIMENT

Figure 4:
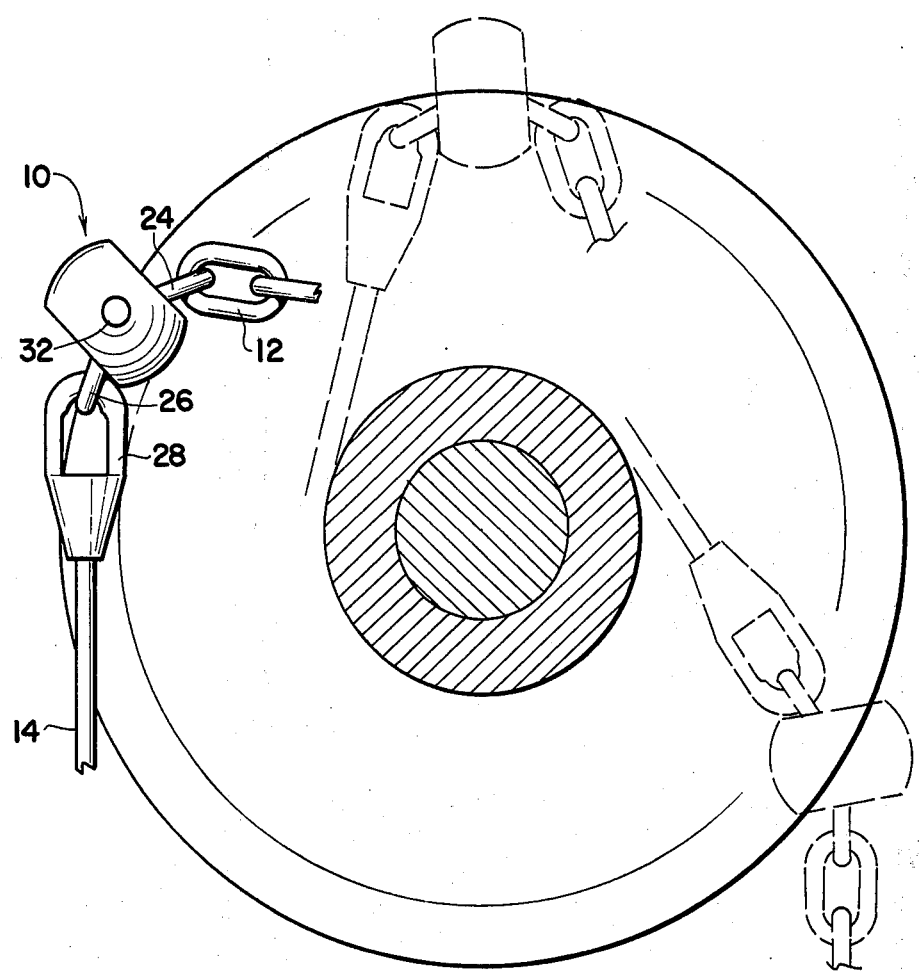
FIGS. 4 and 5 illustrate how the connector attached to a chain and wire rope makes contact with a sheave at various positions as it passes over the sheave.

The improved wire rope to chain connector of the present invention and how it functions can perhaps be best explained and understood by reference to the accompanying drawings. FIG. 1 illustrates a partial cutaway view of a preferred embodiment of the connector, generally indicated by the numeral 10, while coupled to chain 12 at one end and wire rope 14 at the other end. Connector 10 (also see FIG. 3 for a disassembled view) is made up of housing 16 having an opening 18 passing through the housing essentially coaxial with the direction of the chain and wire rope when extended under tension. This axially symmetric opening is further adapted such as to allow both the chain and the wire rope maximum freedom to swivel and bend relative to the axis. The exterior surface of the housing 16 is circularly concentric, in this case essentially spherical, to allow rotational freedom when in contact with the outer peripheral surface of a sheave (See FIGS. 4 and 5).

Housing 16 is further provided with an opening to accept retaining pin 20. When inserted, retaining pin 20 is perpendicular to the axis of the opening and intersects this opening at essentially the center of the housing. In the assembled state, as illustrated, the retaining pin 20 threads through the openings 22 (See FIG. 3) in the arms of a pair of U-shaped members 24 and 26 which are adapted to fit within the opening 24 links or fastens to the chain 12 and the other U-shaped member 26 links to the eyelet 28 on the end of the wire rope 14 such that the U-shaped members 24 and 26 and hence the chain 12 and wire rope 14 can rotate about the axis of the retaining pin 20.

Figure 9:
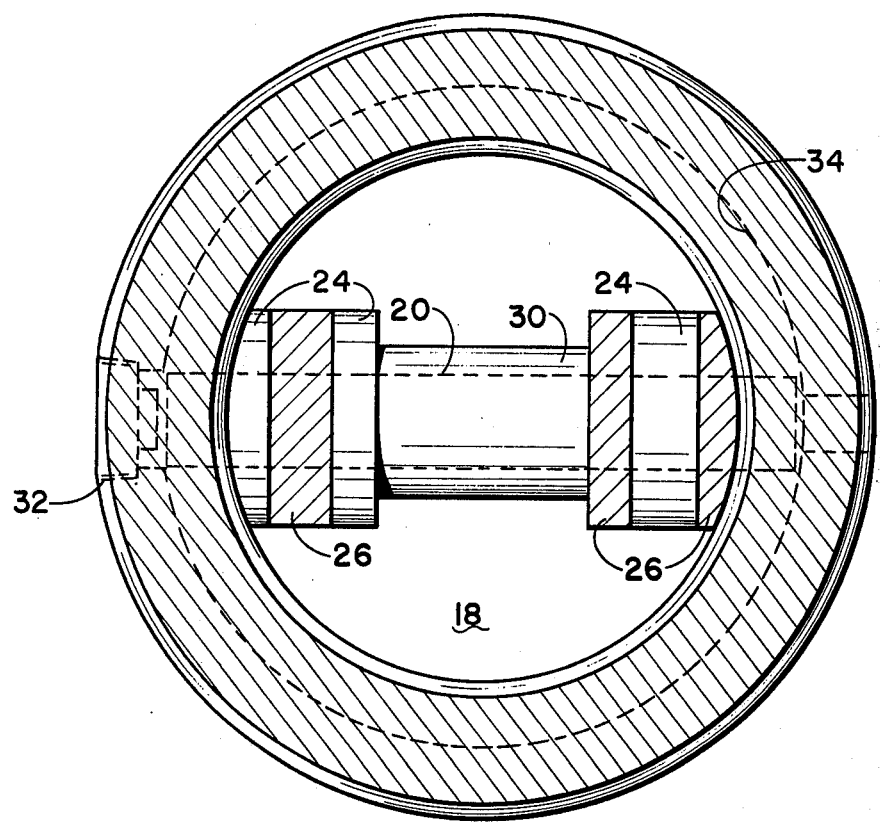
FIG. 9 is a cross-sectional view, equivalent to FIG. 2, of an alternate embodiment of a connector according to the present invention.

Retaining pin 20 is held in place by a retaining cap 32 inserted in the opening in housing 16 provided to accept the retaining pin. A concentric sleeve or spacer 30 is provided to slip over retaining pin 20, in the assembled state, creating additional structural strength to resist collapse of the U-shaped members under extreme tension. In an alternate preferred embodiment and as illustrated in FIG. 9, the interior of housing 16 is provided with circular groove 34 such as to allow retaining pin 20 to pivot internal to the housing 16 further assisting in rotational freedom as the connector passes over a sheave or the like.

To disassemble the connector illustrated in FIGS. 1, 2 and 3 the retaining cap 32 is removed and retaining pin 20 is extracted from the housing 16. Upon removal of the retaining pin the U-shaped members 24 and 26 will disengage from each other and can be withdrawn from the housing and from the chain or wire rope. Reassembly of the connector is performed essentially in the reverse order.

Figure 5:
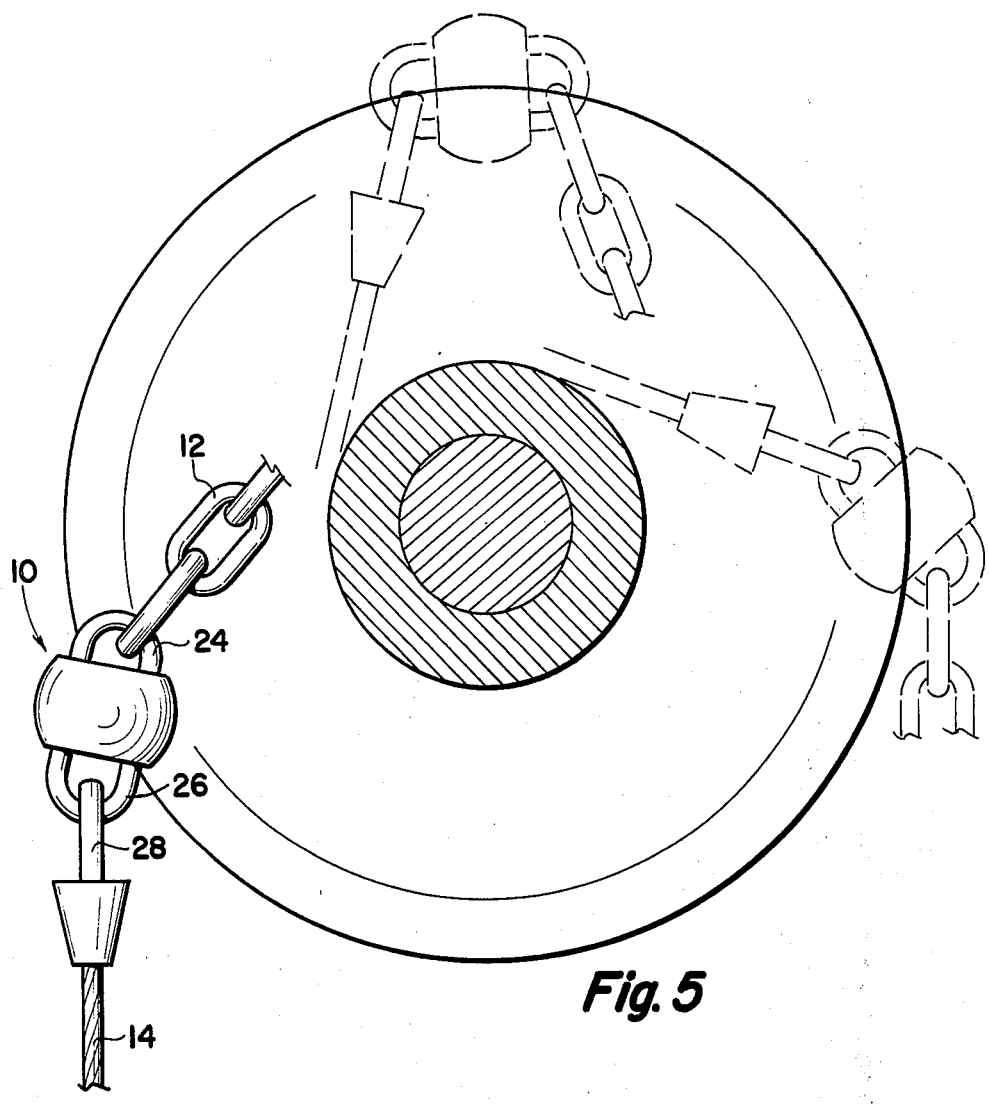

In operation (See FIGS. 4 through 8) the essentially spherical exterior surface of the housing 16 is sized to engage and rest on the outer peripheral portion of the sheave over which the chain, connector and wire rope are to traverse while both the chain and wire rope ride on inner grooves of the same sheave of much smaller diameter. The sharp bends and high tension occuring at the eyelet end of the wire rope are significantly reduced alleviating the problems associated with induced strain. As illustrated in FIGS. 4 and 5 the connector of the present invention is capable of approaching the sheave with the U-shaped members being either horizontal or vertical and in fact at any arbitrary angular orientation and still be sufficiently flexible to allow both the chain and the cable to traverse a wide range of relative angles to each other. As is shown in FIGS. 6 through 8 various inner diameter sheave grooves can be used in conjunction with the present connector including but not limited to a flat chain ledge, a cogged chain ledge, sloped sidewalls and the like.

The actual choice of U-shaped members and means for securing the retaining pin in the housing can be selected from any of the well known methods and apparatus known in the art. If extremely large angles are required between the direction the chain or wire rope approaches and exits the sheave, a plurality of connectors in series with an appropriate number of links of chain between each can be easily employed to distribute the peripheral entrance and exist pivot points at a greater distance apart on the outer circumference of the sheave. Furthermore, the present invention allows the operator to quickly and fully detach the connector from either the wire cable eyelet or the last chain link or both and then reassemble just as easily.

Having thus described the preferred embodiment with a certain degree of particularity, it should be understood that many changes may be made in the details of the construction and the arrangement of the components without departing from the spirit and scope of this disclosure. As such the invention is not intended to be limited to the specific embodiments set forth herein for purposes of exemplification but is to be limited only be the scope of the attached claims including the full range of equivalency to which each element thereof is entitled.

What is claimed is:

1. A connector for coupling a chain to a wire rope comprising:
   a housing having an axially symmetric opening through said housing and an exterior surface circularly concentric to said opening;
   a retaining pin adapted to mount within said housing such that said pin perpendicularly intersects the longitudinal axis of said opening at essentially the center of said housing;
   a pair of substantially U-shaped members capable of being assembled within said opening of said housing and said U-shaped members having openings at the end of each arm of said U-shaped members such as to interact, when assembled, with each other so that the openings will be coaxial and will accept said retaining pin; and
   a means to maintain said U-shaped members, pin and housing in an assembled state.

2. A connector of claim 1 wherein said exterior surface of said housing is essentially spherical.

3. A connector of claims 1 or 2 wherein said exterior surface of said housing is adapted to rest on an outer peripheral portion of a wheel employed to guide said chain and wire rope such that said wire rope does not experience excessive strain as said connector passes over said wheel.

4. A connector of claim 1 or 2 wherein said axially symmetric opening is adapted to allow significant angular deviation from and about the axis for both said chain and wire rope.

5. A connector of claim 1 or 2 further comprising; a circular groove within said housing adapted to allow said retaining pin to rotate with said circularly concentric opening.

* * * * *